United States Patent
He et al.

(10) Patent No.: US 11,790,166 B2
(45) Date of Patent: Oct. 17, 2023

(54) QUALITY ASSESSMENT METHOD FOR AUTOMATIC ANNOTATION OF SPEECH DATA

(71) Applicant: Kunming University, Kunming (CN)

(72) Inventors: Jun He, Kunming (CN); Caiqing Zhang, Kunming (CN); Fei Deng, Kunming (CN); Shikai Shen, Kunming (CN); Yifang Zhou, Kunming (CN); Weihao Yue, Kunming (CN)

(73) Assignee: KUNMING UNIVERSITY, Kunming (CN)

( * ) Notice: Subject to any disclaimer, the term of this patent is extended or adjusted under 35 U.S.C. 154(b) by 163 days.

(21) Appl. No.: 17/530,495

(22) Filed: Nov. 19, 2021

(65) Prior Publication Data

US 2022/0164531 A1 May 26, 2022

(30) Foreign Application Priority Data

Nov. 20, 2020 (CN) .......................... 202011312501.5

(51) Int. Cl.
*G06F 40/232* (2020.01)
*G06F 40/169* (2020.01)

(52) U.S. Cl.
CPC .......... *G06F 40/232* (2020.01); *G06F 40/169* (2020.01)

(58) Field of Classification Search
CPC ... G06F 40/232; G06F 40/169; G10L 15/063; G10L 15/22; G10L 15/19; G10L 26/63; G60N 20/00
See application file for complete search history.

(56) References Cited

U.S. PATENT DOCUMENTS

| | | | |
|---|---|---|---|
| 9,037,967 B1 * | 5/2015 | Al-Jefri | G06F 40/232 715/257 |
| 10,594,757 B1 * | 3/2020 | Shevchenko | G10L 15/197 |
| 2007/0245308 A1 * | 10/2007 | Hill | G06F 40/169 717/114 |
| 2016/0357731 A1 * | 12/2016 | Zorzin | G06F 40/232 |
| 2021/0272550 A1 * | 9/2021 | Aher | G10L 25/51 |
| 2021/0358496 A1 * | 11/2021 | Sukumar | G10L 21/02 |

FOREIGN PATENT DOCUMENTS

| | | | | |
|---|---|---|---|---|
| CA | 3150535 A1 * | 3/2021 | ......... | G06F 16/2457 |
| JP | 2004005648 A * | 1/2004 | ......... | G06F 17/241 |
| WO | WO-2017160341 A1 * | 9/2017 | ......... | G06F 17/24 |

* cited by examiner

*Primary Examiner* — Mohammad K Islam
(74) *Attorney, Agent, or Firm* — WPAT, PC

(57) ABSTRACT

A quality assessment method for automatic annotation of speech data is provided and includes: building a base rule-base of automatically annotated speech data based on quality key indicators; reading automatically annotated speech data to be detected, and performing quality detection on the automatically annotated speech data to be detected according to the quality key indicators to thereby complete quality measurement; updating an automatically annotated speech dataset according to a result of the quality measurement; and importing the automatically annotated speech dataset after the updating into the base rule-base. The shortcomings of using traditional quality assessment methods for data annotation in automatic machine annotations can be overcome, and it can play a very positive supporting role in promoting the development of ethnic minority speech intelligence.

7 Claims, 1 Drawing Sheet

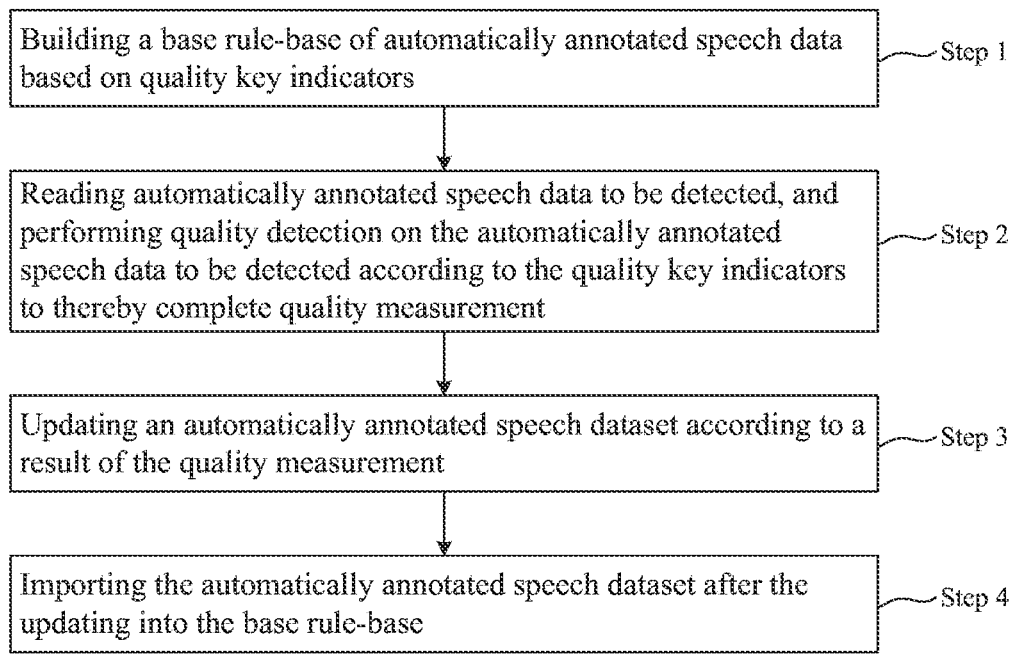

QUALITY ASSESSMENT METHOD FOR AUTOMATIC ANNOTATION OF SPEECH DATA

TECHNICAL FIELD

The invention relates to the technical field of linguistic information processing, and more particularly to a quality assessment method for automatic annotation of speech data.

DESCRIPTION OF RELATED ART

In recent years, automatic data annotation has gradually become a key basic technology for artificial intelligence (AI), and it is hoped that automatic machine annotation can replace manpower, and a great progress has been made in automatic annotations of images. The extreme scarcity of speech annotation data has become a key factor of limiting performance of speech recognition for ethnic minorities in China. Since data annotation errors are difficult to avoid resulting from factors such as raw data quality, manual errors and model limitations, it is important to introduce an effective quality assessment method, but non-uniform standards and variable annotation qualities of data annotations largely hinder applications and developments of data annotations.

Existing quality assessment methods for manual data annotations mainly include: first, the quality assessment method for annotation based on manual participation, which mainly draws an assessment conclusion through a sampling analysis by a quality inspector; and second, the quality assessment method based on a probability model, which mainly realizes quality assessment and error correction through statistics of annotation quality data. However, these methods are mainly used for quality assessments for manual data annotations and are not suitable for quality assessments of automatic data annotations, and main reasons are that error causes, quality problem types and rules are completely different between automatic machine annotation and manual annotation.

SUMMARY

An objective of the invention is to address the defects in the prior art and thus provide a quality assessment method for automatic annotation of speech data, which can solve the following problems: first, speech automatic annotation data done by machine can be performed with a quality assessment to discover quality problems such as "wrong annotation and missing annotation" existed in the annotation data, thereby improving the quality of automatic data annotation; second, aiming at essential differences between the anatomic annotation and the manual annotation, based on the existing quality assessment method based on probability model, a logical reasoning mechanism based on a rule-base is introduced to form a complete and efficient automatic annotation method.

Specifically, a quality assessment method for automatic annotation of speech data, may include steps as follows:
step 1, building a base rule-base of automatically annotated speech data according to quality key indicators, wherein the quality key indicators include word error rate WER, sentence error rate SER, bias feature error rate PAR and user feedback error rate CER;
step 2, reading automatically annotated speech data to be detected, and performing quality detection on the automatically annotated speech data to be detected according to the quality key indicators to thereby complete quality measurement;
step 3, updating an automatically annotated speech dataset according to a result of the quality measurement; and
step 4, importing the automatically annotated speech dataset after the updating into the base rule-base.

In an embodiment, the step 2 includes the following sub-steps:
sub-step 21, acquiring the automatically annotated speech data to be detected, separating tags of annotating words, annotating sentences, and bias feature annotations in the acquired automatically annotated speech data, and storing the tags respectively as a word annotation set, a sentence annotation set and a bias feature annotation set;
sub-step 22, comparing the word annotation set with a word error rate rule in the base rule-base, recording numbers of annotated error words, and then calculating a word error rate and recording error locations and types, wherein the numbers of annotated error words comprise three types of inserting, deleting and substituting;
sub-step 23, comparing the sentence annotation set with a sentence error rate rule in the base rule-base, recording number of annotated error sentences, and then calculating a sentence error rate and recording error locations and types;
sub-step 24, comparing the bias feature annotation set with a bias feature rule in the base rule-base, recording number of sentences of being not annotated with bias feature, and then calculating a bias feature error rate and recording error locations and types;
sub-step 25, comparing the word annotation set, the sentence annotation set and the bias feature annotation set with a user feedback error rule and recording errors obtained through the comparing, and then calculating a user feedback error rate and recording error locations and types; and
sub-step 26, performing a formula calculation on the word error rate, the sentence error rate, the bias feature error rate and the user feedback error rate to obtain a quality score of the automatically annotated speech dataset;
a formula for obtaining the quality score is that:

$$AQM=(q_1WER+q_2SER+q_3PAR+q_4CER)*100\%$$

where $q_1$, $q_2$, $q_3$, $q_4$ represent weights of the quality key indicators respectively and satisfy that $$\sum\nolimits_{i=1}^{4} q_i = 1;$$

and AQM represents the quality score.

In an embodiment, the step 3 includes the following sub-steps:
sub-step 31, setting a quality threshold, and the updating being not performed when the quality score is greater than the quality threshold;
sub-step 32, performing the updating when the quality score is less than the quality threshold, and performing operations of tag deletion, tag substitution and tag insertion according to error locations and types recorded in a quality scoring process;

sub-step 33, performing quality assessment again after the updating until the quality score is greater than the quality threshold.

In an embodiment, the building a base rule-base of automatically annotated speech data in the step 1 includes the following sub-steps:

sub-step 11, generating a base rule layer, wherein base rules are generated according to the quality key indicators and used as base standards of a rule-base;

sub-step 12, generating a custom rule layer, wherein rules are defined according to business requirements and thereby data annotation rules are generated, and the data annotation rules comprise speech data annotation rules and minority language annotation rules;

sub-step 13, generating a user rule layer, wherein test users feedback quality results, a unified text template is used to collect feedback opinions, and the feedback opinions after manual review are imported into the rule-base to generate rules.

sub-step 14, performing rule detection, comprising detecting whether there is a logical conflict among all the rules generated in the sub-step 11 through sub-step 13, modifying the rule with the logical conflict and then performing the detecting again until there is no logical conflict; and sub-step 15, using the rule-base after performing the rule detection as the base rule-base.

In an embodiment, in the quality assessment method for automatic annotation of speech data, the word error rate is calculated as WER=(S+D+I)/N, where S represents the number of annotated error words to be substituted, D represents the number of annotated error words to be deleted, I represents the number of annotated error words to be inserted and N represents a total number of annotated words; and is corresponding to a base rule layer and a custom rule layer of the base rule-base;

the sentence error rate is calculated as SER=EN/TN, where EN represents the number of annotated error sentences, a sentence is determined as the annotated error sentence if the sentence contains the annotated error word, TN represents a total number of annotated sentences; and is corresponding to the base rule layer and the custom rule layer;

the bias feature error rate is calculated as PAR=AN/QN, where AN represents number of sentences of being not annotated with bias feature, and QN represents a total number of bias features in the base rule-base; and is corresponding to the base rule layer and the custom rule layer; and the user feedback error rate is calculated as CER= $(w_1 *B_1+w_2 *B_2+w_3 *B_3)/M$, where $B_1$, $B_2$, $B_3$ respectively represent number of word errors, number of sentence errors and number of bias feature errors in the automatically annotated speech data to be detected as per the user feedback error rule, $w_1$, $w_2$, $w_3$ represent corresponding weights, and M represents a sum of three types errors being the word errors, the sentence errors and the bias feature errors; and is corresponding to a user rule layer of the base rule-base.

In an embodiment, the sub-step 13 includes:

giving a rule template to facilitate the test users after finding quality problems of the automatically annotated speech dataset to fill in the template for feedback, wherein the rule template is capable of being read directly and imported into the base rule-base; and manually reviewing normalization and rationality of each of the feedback opinions, wherein the feedback opinion is imported into the rule-base after a result of the reviewing is pass, otherwise the feedback opinion is not imported into the rule-base.

The invention may achieve advantages as follows.

First, the invention relates to a quality assessment method dedicated to automatic annotation of speech data, which is significantly different from existing manual or semi-automatic annotation methods.

Second, the invention adopts "logical reasoning" based on rule-base to achieve quality assessment, which is different from the existing probability model assessment method. Moreover, the invention can ensure a comprehensive and effective assessment method by layering of rule-base and multi-level assessment indicators of processing traditional errors, dialectal biases and user feedback.

Specifically, the vast majority of existing deep learning methods are methods based on probability models, and speech automatically annotated data are obtained by probability statistical methods based on neutral networks. Therefore, the same theoretical approach/method can no longer be used for assessment. The use of "logical reasoning" may have the following advantages:

1. quality assessment experiences summarized by humans can be expressed in the form of rules (knowledge) and reused;
2. the quality detection method based on the rule-base can make up for deficiencies of the "automatic annotation results obtained by machine learning model training" (such as insufficient data samples, over-fitting, model defects, etc.), and truly realize that human logic knowledge and data-based probabilistic and statistical results are combined with each other and learn from each other's strengths. As a result, the quality of annotation can be greatly improved; and
3. errors in the automatic annotation of the machine are regular and traceable, and they usually appear repeatedly and in large numbers, which can make the method based on rule-base be easy to identify errors (often a type of error will greatly reduce the score) and update the errors.

Third, the invention introduces the user feedback mechanism, which is an error correction mechanism for avoiding errors such as "missing annotation" and "wrong annotation" occurred during automatic machine annotation.

In addition, the invention may have beneficial effects as follows.

(1) It can make up for the shortcomings of using traditional quality assessment methods for data annotation in automatic machine annotations.

(2) It proposes a special data annotation quality assessment method for speeches (especially ethnic minority languages greatly influenced by dialects and Chinese)), which may have a very positive supporting role in promoting the development of ethnic minority speech intelligence.

BRIEF DESCRIPTION OF DRAWING

The FIG. 1 is a schematic flowchart of a quality assessment method for automatic annotation of speech data according to the invention.

DETAILED DESCRIPTION OF EMBODIMENTS

In order to make objectives, technical solutions and advantages of the invention more clear, the technical solutions of the invention will be described below more clear and complete. Apparently, the described embodiments are some of embodiments of the invention, rather than all embodiments of the invention. Based on the described embodiments of the invention, all other embodiments obtained by those skilled in the art without creative effort should fall within the protection scope of the invention.

Quality detection mechanism for automatic annotation data. Due to a understanding difference between human and machine to "annotation errors", there is a certain difficulty to carry out quality detection on a large amount of automatic annotation data completed automatically by computers, so it is necessary to suitably adopt an original manual method. A basic idea of design for the detection mechanism is to establish a key indicator system for the quality assessment, and extract "error-easy-occurrence" points such as words at beginning and ending of sentences, Chinese borrowed words and differential words of branching languages in an annotation process to build a rule-base. A statistical result of errors or suspected errors is obtained through model calculation for manual review. In addition, it is necessary to introduce a feedback mechanism of test users to gradually enrich the rule-base.

Data annotation quality measurement method. The automatic annotation method adopts a probability-based learning method, while the quality measurement requires a more "precise" method. Therefore, the invention adopts a measurement method based on key indicators. In particular, an indicator system including factors such as word error rate, sentence error rate, feature error rate and user feedback rate is established, weights of the indicators are trained by a large amount of automatic annotation data, and parameters are continuously optimized by using a quality feedback mechanism, thereby continuously improving performance of the model.

Since automatic annotation models mainly use probabilistic prediction methods, it would be more effective to use a rule-based logical reasoning method to detect the quality of annotation. At present, a data cleaning technology based on rule-base in the field of big data technology is relatively mature, and the invention, based on studies on these methods, builds a "quality detection model for speech annotation data based on a rule-base". Buildings of the rule-base and the key indicators in the model are crucial, and a user feedback mechanism is introduced on the basis of self-built indicators to timely discover easy error-occurrence points of annotation and common problems and continuously enrich content of a key-indicator-base, thereby gradually improving accuracy of quality detection for annotation data.

The FIG. 1 is a schematic flowchart of a quality assessment method for automatic annotation of speech data according to the invention. As shown in the FIG. 1, the method includes steps as follows.

Step 1, building a base rule-base for automatically annotated speech data based on quality key indicators in advance.

The quality key indicators include: word error rate WER, sentence error rate SER, bias feature error rate PAR, and user feedback error rate CER.

Step 2, reading automatically annotated speech data to be detected, and performing quality detection on the automatically annotated speech data to be detected according to the quality key indicators to thereby complete quality measurement.

Step 3, updating the automatically annotated speech dataset according to a result of the quality measurement.

Step 4, importing the automatically annotated speech dataset after the updating into the base rule-base.

In a preferred embodiment, the step 2 include sub-steps as follows.

Sub-step 21, acquiring the automatically annotated speech data to be detected, separating tags of annotating words, annotating sentences, and bias feature annotation in the automatically annotated speech data to be detected, and storing the tags as a word annotation set, a sentence annotation set and a bias feature annotation set.

Sub-step 22, comparing the word annotation set with a word error rate rule in the base rule-base, recording numbers of annotated error words, and then calculating a word error rate and recording error locations and types. The numbers of annotated error words include three types of inserting, deleting and substituting.

Sub-step 23, comparing the sentence annotation set a with rule of sentence error rate in the base rule-base, recording number of annotated error sentences, and then calculating a sentence error rate and recording error locations and types.

Sub-step 24, comparing the bias feature annotation set with a bias feature rule in the base rule-base, recording number of sentences being not annotated with bias feature, and then calculating a bias feature unannotation rate (also referred to as bias feature error rate) and recording error locations and types.

Sub-step 25, comparing the word annotation set, the sentence annotation set and the bias feature annotation set with a user feedback error rule, recording errors obtained through the comparing, and then calculating a user feedback error rate and recording locations and types of errors.

Sub-step 26, perform formula calculation on the word error rate, the sentence error rate, the bias feature unannotation rate and the user feedback error rate to obtain a quality score of each the automatically annotated speech dataset.

A quality scoring formula is that:

$$AQM=(q_1WER+q_2SER+q_3PAR+q_4CER)*100\%$$

where $q_1$, $q_2$, $q_3$, $q_4$ respectively represent weights of the quality key indicators and satisfy the condition $$\sum_{i=1}^{4} q_i = 1,$$

and AQM represents the quality score.

The word error rate is calculated as: WER=(S+D+I)/N, where S represents the number of annotated error words to be replaced, D represents the number of annotated error words to be deleted, I represents the number of annotated error words to be substituted, N represents a total number of annotated words; and corresponding to a base rule layer and a custom rule layer.

The sentence error rate is calculated as: SER=EN/TN, where EN represents the number of annotated error sentences, if a sentence contains an annotated error word(s), it is determined that the sentence is error, TN represents a total number of annotated sentences; and corresponding to the base rule layer and the custom rule layer.

The bias feature error rate is calculated as that: PAR=AN/QN, AN represents the number of sentences of being not annotated with bias feature, QN represents number of bias features in the rule-base; and corresponding to the base rule layer and the custom rule layer.

The user feedback error rate is calculated as: CER=$(w_1*B_1+w_2*B_2+w_3*B_3)/M$, where $B_1$, $B_2$, $B_3$ represent number of word errors, number of sentence errors and number of bias feature errors of the sample data in the user feedback error rule respectively, $w_1$, $w_2$, $w_3$ represents corresponding weights, M represents the sum of the three types of errors in the sample data; and corresponding to a user rule layer.

In a preferred embodiment, the step 3 includes sub-steps as follows.

Sub-step 31, setting a quality threshold, and the updating being not performed when the quality score is greater than the quality threshold.

Sub-step 32, performing the updating when the quality score is less than the quality threshold, and performing operations of tag deletion, tag substitution and tag insertion according to locations and types of errors recorded during a quality scoring process.

Sub-step 33, performing quality assessment again after the updating until the quality score is greater than the quality threshold.

In a preferred embodiment, in the step 1, the building a base rule-base for automatically annotated speech data includes sub-step 11 through sub-step 15 as follows.

Sub-step 11, generating a base rule layer. In particular, base rules are generated according to the quality key indicators and used as base standards of a rule-base.

Sub-step 12, generating a custom rule layer. In particular, rules are defined according to business requirements and thereby data annotation rules are generated. The data annotation rules include: speech data annotation rules, minority language data annotation rules.

Sub-step 13, generating a user rule layer. In particular, the test users feedback quality results, a unified text template is used to collect feedback opinions from the test users, and the feedback opinions after manual review are imported into the rule-base to generate rules.

More specifically, the sub-step 13 may include:

sub-step 131, giving a rule template beforehand to facilitate test users to fill in the template for feedback after finding/discovering quality problems of the automatically annotated speech dataset, the rule template may be read directly and imported into the rule-base; and sub-step 132, manually reviewing normalization and rationality of each of the feedback opinions, and importing the feedback opinion into the rule-base when the reviewing passes or doing not import the feedback opinion when the reviewing is failed.

Sub-step 14, performing rule detection. In particular, whether there is a logical conflict among all the above rules in the sub-step 11, the sub-step 12 and the sub-step 13 is detected, the rules with logical conflicts would be modified and then detected again until all logical conflicts disappear.

Sub-step 15, using the rule-base after performing the rule detection as the base rule-base.

Finally, it should be noted that the above embodiments are only used to illustrate technical solutions of the invention, rather than to limit the invention. Although the invention has been described in detail with reference to the foregoing embodiments, those skilled in the art should understand that they can still modify the technical solutions described in the foregoing embodiments, or equivalently substitute some of the technical features equally; and these modifications or substitutions do not cause essences of corresponding technical solutions to deviate from the spirit and scope of the technical solutions of embodiments of the invention.

What is claimed is:

1. A quality assessment method for automatic annotation of speech data, comprising:

step 1, building a base rule-base of automatically annotated speech data according to quality key indicators, wherein the quality key indicators comprise word error rate WER, sentence error rate SER, bias feature error rate PAR and user feedback error rate CER;

step 2, reading automatically annotated speech data to be detected, and performing quality detection on the automatically annotated speech data to be detected according to the quality key indicators to thereby complete quality measurement;

step 3, updating an automatically annotated speech dataset according to a result of the quality measurement; and step 4, importing the automatically annotated speech dataset after the updating into the base rule-base;

wherein the quality assessment method for automatic annotation of speech data further comprises: applying the base rule-base including the automatically annotated speech dataset after the updating in promoting a development of ethnic minority speech intelligence.

2. The quality assessment method for automatic annotation of speech data as claimed in claim 1, wherein the step 2 comprises:

sub-step 21, acquiring the automatically annotated speech data to be detected, separating tags of annotating words, annotating sentences, and bias feature annotations in the acquired automatically annotated speech data, and storing the tags respectively as a word annotation set, a sentence annotation set and a bias feature annotation set;

sub-step 22, comparing the word annotation set with a word error rate rule in the base rule-base, recording numbers of annotated error words, and then calculating a word error rate and recording error locations and types, wherein the numbers of annotated error words comprise three types of inserting, deleting and substituting;

sub-step 23, comparing the sentence annotation set with a sentence error rate rule in the base rule-base, recording number of annotated error sentences, and then calculating a sentence error rate and recording error locations and types;

sub-step 24, comparing the bias feature annotation set with a bias feature rule in the base rule-base, recording number of sentences of being not annotated with bias feature, and then calculating a bias feature error rate and recording error locations and types;

sub-step 25, comparing the word annotation set, the sentence annotation set and the bias feature annotation set with a user feedback error rule and recording errors obtained through the comparing, and then calculating a user feedback error rate and recording error locations and types; and sub-step 26, performing a formula calculation on the word error rate, the sentence error rate, the bias feature error rate and the user feedback error rate to obtain a quality score of the automatically annotated speech dataset;

wherein a formula for obtaining the quality score is that:

$$AQM=(q_1 WER+q_2 SER+q_3 PAR+q_4 CER)*100\%$$

where $q_1$, $q_2$, $q_3$, $q_4$ represent weights of the quality key indicators respectively and satisfy that $$\sum_{i=1}^{4} q_i = 1;$$

and AQM represents the quality score.

3. The quality assessment method for automatic annotation of speech data as claimed in claim 2, wherein the step 3 comprises:
- sub-step 31, setting a quality threshold, and the updating being not performed when the quality score is greater than the quality threshold;
- sub-step 32, performing the updating when the quality score is less than the quality threshold, and performing operations of tag deletion, tag substitution and tag insertion according to error locations and types recorded in a quality scoring process;
- sub-step 33, performing quality assessment again after the updating until the quality score is greater than the quality threshold.

4. The quality assessment method for automatic annotation of speech data as claimed in claim 1, wherein the building a base rule-base of automatically annotated speech data in the step 1 comprises:
- sub-step 11, generating a base rule layer, wherein base rules are generated according to the quality key indicators and used as base standards of a rule-base;
- sub-step 12, generating a custom rule layer, wherein rules are defined according to business requirements and thereby data annotation rules are generated, and the data annotation rules comprise speech data annotation rules and minority language annotation rules;
- sub-step 13, generating a user rule layer, wherein test users feedback quality results, a unified text template is used to collect feedback opinions, and the feedback opinions after manual review are imported into the rule-base to generate rules;
- sub-step 14, performing rule detection, comprising detecting whether there is a logical conflict among all the rules generated in the sub-step 11 through sub-step 13, modifying the rule with the logical conflict and then performing the detecting again until there is no logical conflict; and
- sub-step 15, using the rule-base after performing the rule detection as the base rule-base.

5. The quality assessment method for automatic annotation of speech data as claimed in claim 2, wherein the word error rate is calculated as WER=(S+D+I)/N, where S represents the number of annotated error words to be substituted, D represents the number of annotated error words to be deleted, I represents the number of annotated error words to be inserted and N represents a total number of annotated words; and is corresponding to a base rule layer and a custom rule layer of the base rule-base;

wherein the sentence error rate is calculated as SER=EN/TN, where EN represents the number of annotated error sentences, a sentence is determined as the annotated error sentence if the sentence contains the annotated error word, TN represents a total number of annotated sentences; and is corresponding to the base rule layer and the custom rule layer;

wherein the bias feature error rate is calculated as PAR=AN/QN, where AN represents number of sentences of being not annotated with bias feature, and QN represents a total number of bias features in the base rule-base; and is corresponding to the base rule layer and the custom rule layer;

wherein the user feedback error rate is calculated as $CER=(w_1*B_1+w_2*B_2+w_3*B_3)/M$, where $B_1$, $B_2$, $B_3$ respectively represent number of word errors, number of sentence errors and number of bias feature errors in the automatically annotated speech data to be detected as per the user feedback error rule, $w_1$, $w_2$, $w_3$ represent corresponding weights, and M represents a sum of three types errors being the word errors, the sentence errors and the bias feature errors; and is corresponding to a user rule layer of the base rule-base.

6. The quality assessment method for automatic annotation of speech data as claimed in claim 4, wherein the sub-step 13 comprises:
- giving a rule template to facilitate the test users after finding quality problems of the automatically annotated speech dataset to fill in the template for feedback, wherein the rule template is capable of being read directly and imported into the rule-base; and manually reviewing normalization and rationality of each of the feedback opinions, wherein the feedback opinion is imported into the rule-base after a result of the reviewing is pass, otherwise the feedback opinion is not imported into the rule-base.

7. A quality assessment method for automatic annotation of speech data, comprising:
- step 1, building a base rule-base of automatically annotated speech data according to quality key indicators, wherein the quality key indicators comprise word error rate WER, sentence error rate SER, bias feature error rate PAR and user feedback error rate CER;
- step 2, reading automatically annotated speech data to be detected, and performing quality detection on the automatically annotated speech data to be detected according to the quality key indicators to thereby complete quality measurement;
- step 3, updating an automatically annotated speech dataset according to a result of the quality measurement to obtain an updated automatically annotated speech dataset;
- step 4, importing the updated automatically annotated speech dataset into the base rule-base; and
- step 5, obtaining a user speech and performing speech recognition on the user speech based on the base rule-base including the updated automatically annotated speech dataset.

* * * * *